(12) United States Patent
Wu

(10) Patent No.: US 7,726,595 B2
(45) Date of Patent: Jun. 1, 2010

(54) PEPPER MILL

(75) Inventor: Ming-Fong Wu, Tainan (TW)

(73) Assignee: Yienn Lih Enterprise Co., Ltd. (TW)

( * ) Notice: Subject to any disclaimer, the term of this patent is extended or adjusted under 35 U.S.C. 154(b) by 0 days.

(21) Appl. No.: 12/267,280

(22) Filed: Nov. 7, 2008

(65) Prior Publication Data
US 2009/0121063 A1    May 14, 2009

(51) Int. Cl.
*A47J 42/04* (2006.01)
(52) U.S. Cl. ................................... 241/169.1
(58) Field of Classification Search ........... 241/168, 241/169, 169.1
See application file for complete search history.

(56) References Cited
U.S. PATENT DOCUMENTS
7,198,214 B1 * 4/2007 Bounds, III .............. 241/169.1
* cited by examiner

*Primary Examiner*—Mark Rosenbaum
(74) *Attorney, Agent, or Firm*—Sheridan Ross P.C.

(57) ABSTRACT

A pepper mill includes a receiving unit defining a receiving space, a grinding unit disposed at one end of the receiving space, and a stop unit dividing the receiving space into first and second space portions that are respectively distal from and proximate to the grinding unit. The stop unit is formed with a passage to permit peppercorns in the first space portion to fall into the grinding unit so as to be ground thereby through the second space portion when the pepper mill is disposed at a dispensing position, and is configured to stop a portion of residual ground pepper in the second space portion from reaching the first space portion via the passage when the pepper mill is disposed at a non-dispensing position.

9 Claims, 7 Drawing Sheets

PEPPER MILL

CROSS-REFERENCE TO RELATED APPLICATION

This application claims priority of Taiwanese Application No. 096219141, filed on Nov. 13, 2007.

BACKGROUND OF THE INVENTION

1. Field of the Invention

The invention relates to a grinder, more particularly to a pepper mill.

2. Description of the Related Art

A conventional pepper mill includes a receiving unit for receiving peppercorns, and a grinding unit coupled to the receiving unit for grinding the peppercorns into ground pepper. In use, the conventional pepper mill is operated at a dispensing position, where the grinding unit faces downwardly for dispensing ground pepper. After use, the conventional pepper mill is turned upside down to a non-dispensing position, where the grinding unit faces upwardly. The receiving unit generally has a transparent surrounding wall so as to permit viewing of the peppercorns retained therein, such that the conventional pepper mill can also be a decorative piece on a dining table.

However, a portion of residual ground pepper will fall into the receiving unit and accumulate on the transparent surrounding wall of the receiving unit when the conventional pepper mill is placed at the non-dispensing position after use, thereby adversely affecting the visual aesthetic quality of the pepper mill.

SUMMARY OF THE INVENTION

Therefore, the object of the present invention is to provide a pepper mill that can alleviate accumulation of residual ground pepper on a transparent portion thereof when the pepper mill is placed at a non-dispensing position after use.

Accordingly, a pepper mill of the present invention comprises a receiving unit, a grinding unit, and a stop unit. The receiving unit defines a receiving space adapted for receiving peppercorns. The grinding unit is disposed in the receiving unit at one end of the receiving space, and is adapted for grinding the peppercorns in the receiving space. The stop unit is disposed in the receiving space, is spaced apart from the grinding unit, and divides the receiving space into first and second space portions that are respectively distal from and proximate to the grinding unit. The stop unit is formed with a passage to permit the peppercorns retained in the first space portion to fall into the grinding unit so as to be ground thereby through the second space portion when the pepper mill is disposed at a dispensing position where the grinding unit faces downwardly, and is configured to stop at least a portion of residual ground pepper in the second space portion from reaching the first space portion via the passage when the pepper mill is disposed at a non-dispensing position where the grinding unit faces upwardly.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
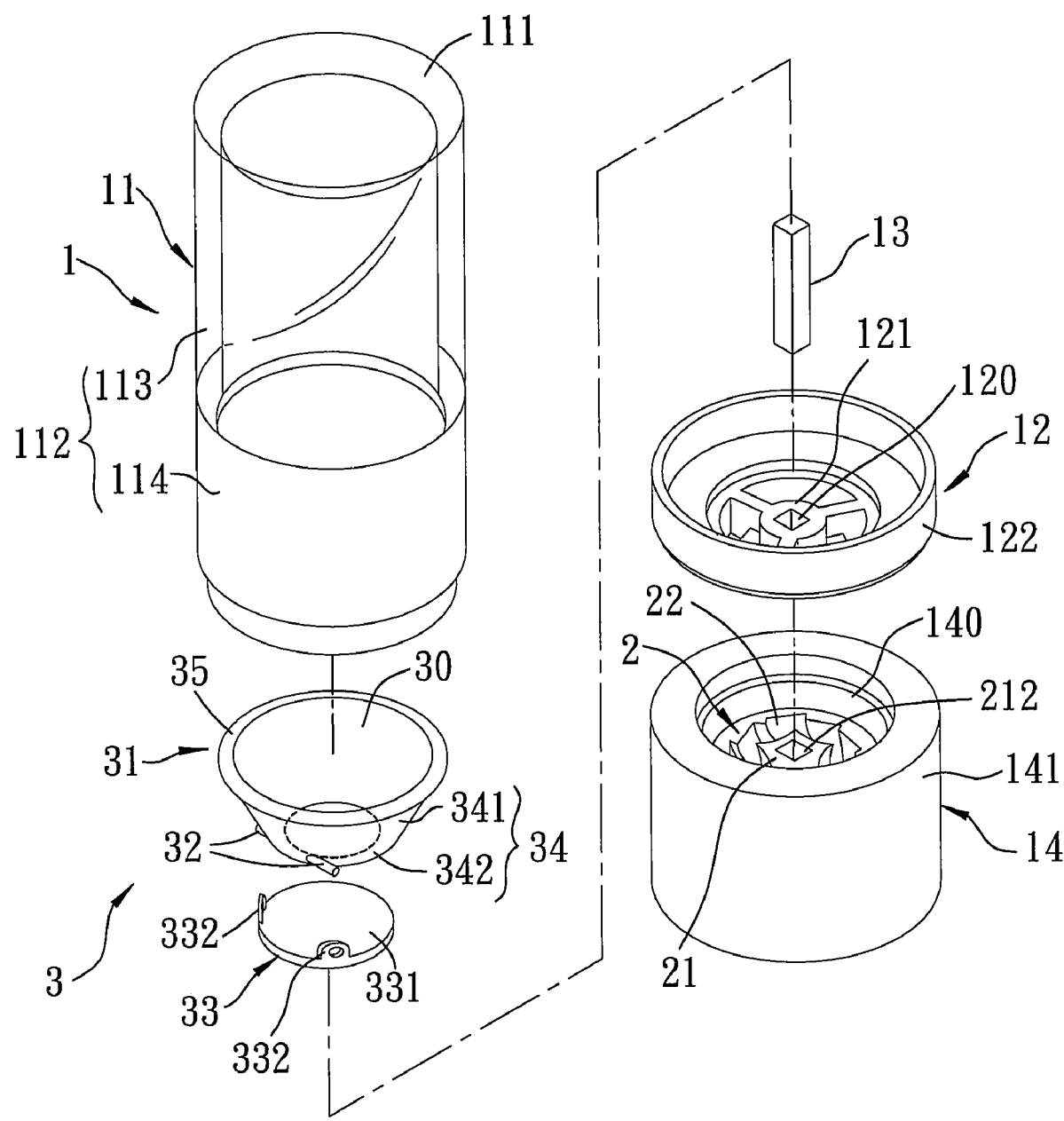
FIG. 1 is an exploded perspective view of a first preferred embodiment of a pepper mill according to the invention.

Before the present invention is described in greater detail, it should be noted that like elements are denoted by the same reference numerals throughout the disclosure.

Figure 2:
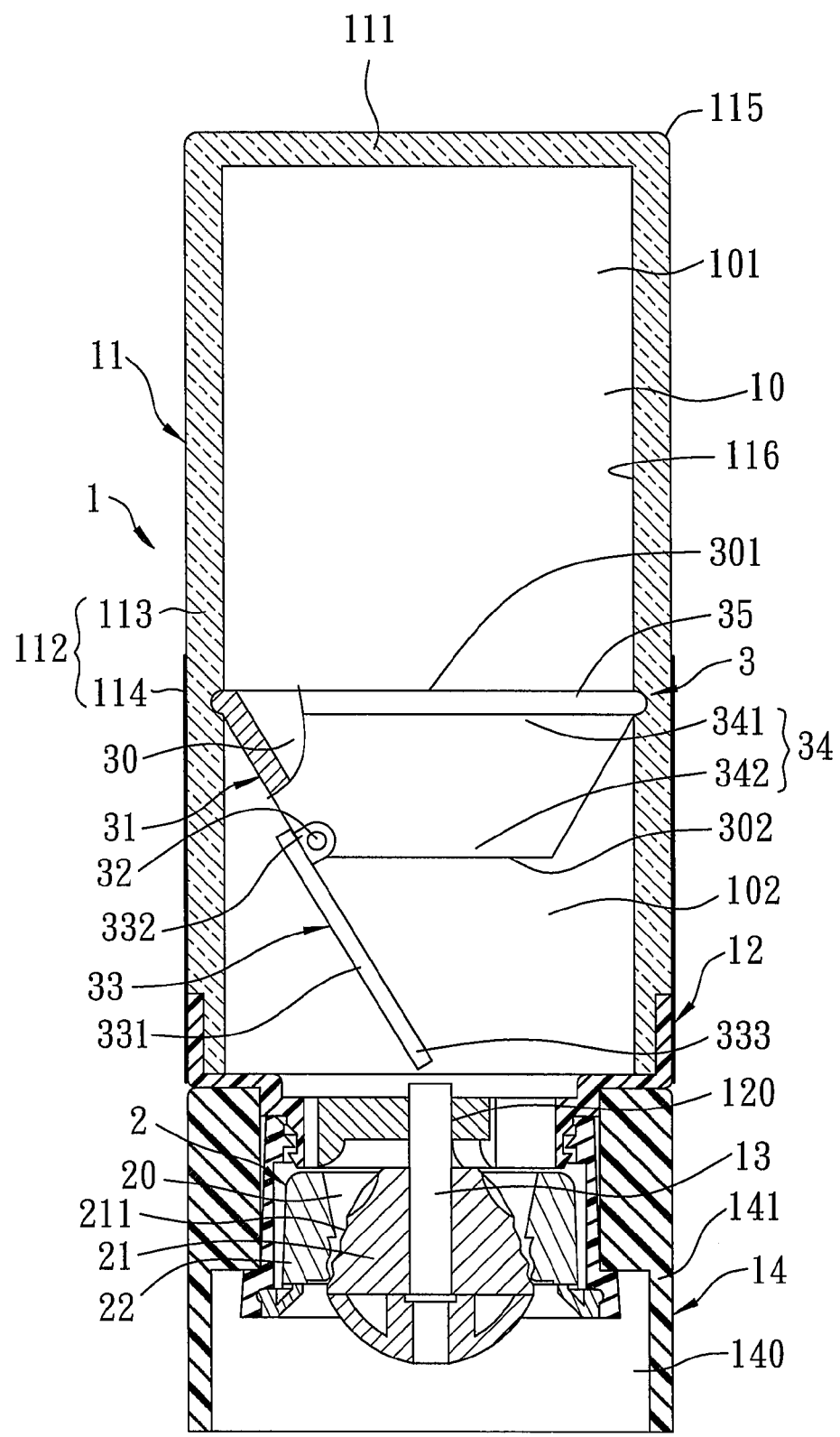
FIG. 2 is an assembled partly sectional view of the first preferred embodiment at a dispensing position.
Figure 3:
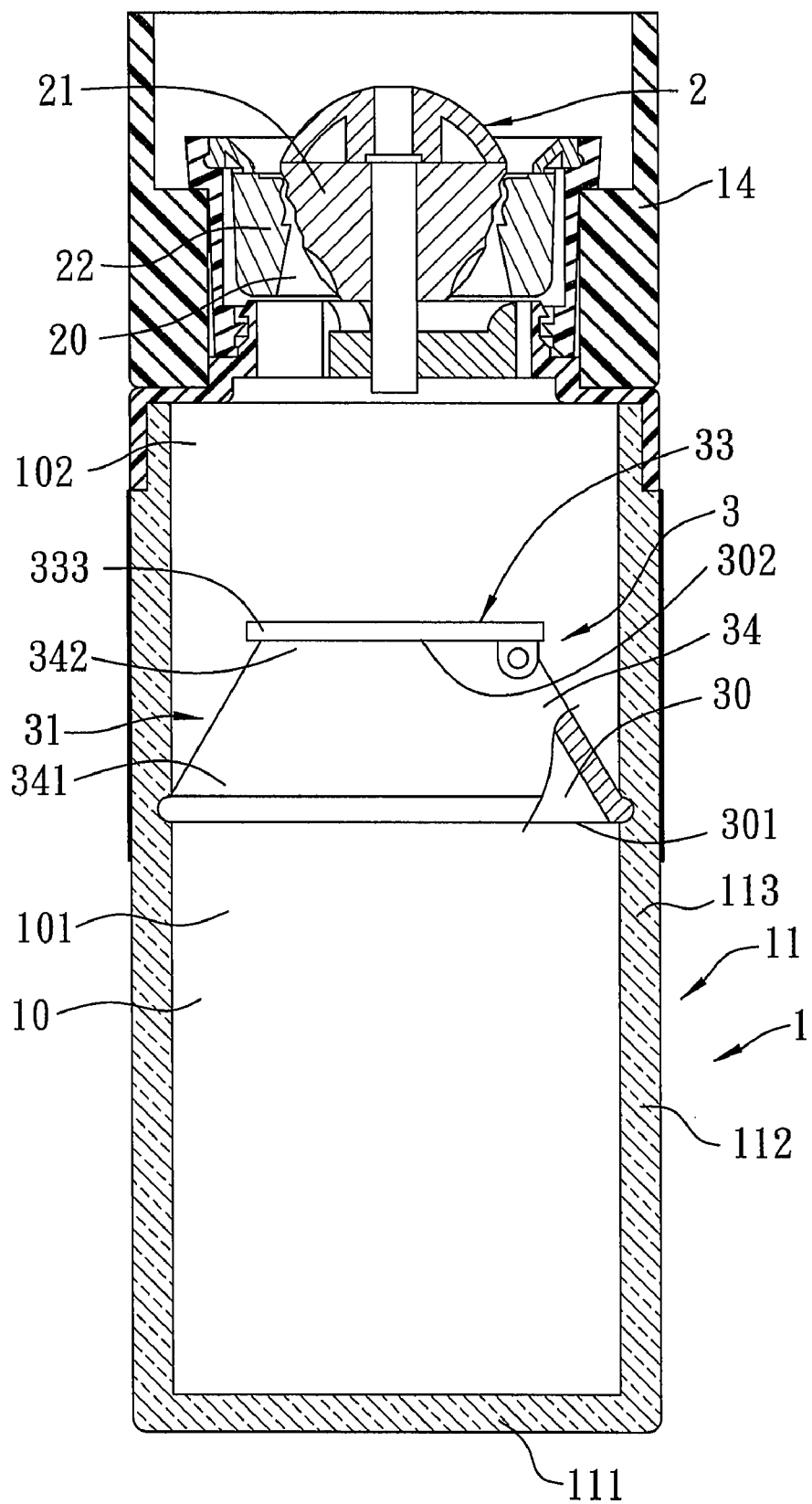
FIG. 3 is an assembled partly sectional view of the first preferred embodiment at a non-dispensing position.

As shown in FIGS. 1 to 3, the first preferred embodiment of a pepper mill according to the present invention includes a receiving unit 1, a grinding unit 2, and a stop unit 3.

The receiving unit 1 defines a receiving space 10 adapted for receiving peppercorns, and includes a container body 11, a connecting seat 12, a coupling shaft 13, and an end seat 14. The container body 11 has an end wall 111 with an end wall periphery 115, and a surrounding container wall 112 extending from the end wall periphery 115 and having an inner wall surface 116. The surrounding container wall 112 is made of a transparent material, and has a portion that is coated to form an opaque wall portion 114, while the non-coated portion forms a transparent wall portion 113. The connecting seat 12 is coupled co-rotatably to the container body 11 at one end of the surrounding container wall 112 opposite to the end wall 111. The connecting seat 12 includes an inner annular wall 121 defining a rectangular shaft hole 120, and an outer annular wall 122 spaced radially apart from the inner annular wall 121. The coupling shaft 13 has a rectangular cross-section corresponding to the form of the shaft hole 120, and extends through the connecting seat 12 via the shaft hole 120. The end seat 14 is coupled to the connecting seat 12 at one side opposite to the container body 11, and includes a surrounding seat wall 141 that has a diameter equal to that of the surrounding container wall 112 and that defines an inner space 140.

The grinding unit 2 is disposed in the inner space 140 in the end seat 14 of the receiving unit 1, and includes an inner grinding seat 21 that is coupled co-rotatably to the coupling shaft 13 of the receiving unit 1, and a stationary outer grinding seat 22 that surrounds the inner grinding seat 21 and that cooperates with the inner grinding seat 21 to define an annular grinding opening 20. The inner grinding seat 21 has a coupling hole 212 through which the coupling shaft 13 extends, and a rough grinding surface 211 that cooperates with the outer grinding seat 22 to grind the peppercorns confined in the receiving space 10 in the receiving unit 1.

The stop unit 3 is disposed in the receiving space 10 in the receiving unit 1, is spaced apart from the grinding unit 2, and divides the receiving space 10 into first and second space portions 101, 102 that are respectively distal from and proximate to the grinding unit 2, such that the transparent wall portion 113 of the surrounding container wall 112 of the container body 11 of the receiving unit 1 confines the first space portion 101, and that the opaque wall portion 114 of the surrounding container wall 112 has the stop unit 3 provided therein, i.e., the stop unit 3 is concealed by the opaque wall portion 114. In this embodiment, the stop unit 3 includes a stop seat 31 secured in the container body 11, a pair of pivot pins 32, and a cover member 33. The stop seat 31 includes a frustoconical surrounding wall 34 defining a passage 30 that has a first opening 301 in spatial communication with the first space portion 101 of the receiving space 10, and a second opening 302 in spatial communication with the second space portion 102 and smaller than the first opening 301. The surrounding wall 34 has a wider portion 341 and a narrower portion 342 that correspond respectively to the first and second openings 301, 302. The stop seat 31 further includes a flange 35 formed at the edge of the wider portion 341 so as to abut tightly against the inner wall surface 116 of the surrounding container wall 112. The pivot pins 32 disposed on the narrower portion 342. The cover member 33 has a cover wall portion 331 with a movable end 333, and a pair of pivot lug portions 332 that protrude from the cover wall portion 331 and that are pivotally and respectively connected to the pivot pins 32.

In use, the pepper mill of the invention is operated at a dispensing position (see FIG. 2), where the grinding unit 2 faces downwardly, and where the movable end 333 of the cover wall portion 331 of the cover member 33 of the stop unit 3 is away from the narrower portion 342 of the surrounding wall 34 of the stop seat 31 of the stop unit 3, such that the cover member 33 uncovers the second opening 302 of the passage 30 in the stop seat 31. When a user rotates the container body 11 of the receiving unit 1 relative to the end seat 14, the connecting seat 12 is driven to rotate along with the coupling shaft 13 relative to the end seat 14, thereby driving rotation of the inner grinding seat 21 of the grinding unit 2 relative to the outer grinding seat 22 so as to grind peppercorns. Therefore, when the pepper mill is at the dispensing portion, the passage 30 permits the peppercorns retained in the first space portion 101 of the receiving space 10 in the receiving unit 1 to fall into the grinding unit 2 so as to be ground thereby through the second space portion 102 of the receiving space 10, and the ground pepper is then dispensed out of the pepper mill of the invention via the inner space 140 in the end seat 14.

After use, the pepper mill of the invention is converted to a non-dispensing position (see FIG. 3), where the grinding unit 2 faces upwardly, and where the movable end 333 of the cover wall portion 331 of the cover member 33 contacts the narrower portion 342 of the surrounding wall 34 of the stop seat 31, such that the cover member 33 covers the second opening 302 of the passage 30 in the stop seat 31. Therefore, when the pepper mill is at the non-dispensing position, the stop unit 3 is configured to stop at least a portion of the residual ground pepper that falls from the grinding unit 2 via the annular grinding opening 20 into the second space portion 102 of the receiving space 10 in the receiving unit 1 from reaching the first space portion 101 of the receiving space 10 via the passage 30 and accumulating on the transparent wall portion 113 of the surrounding container wall 112 of the container body 11, thereby effectively overcoming the drawback of the prior art.

Figure 4:
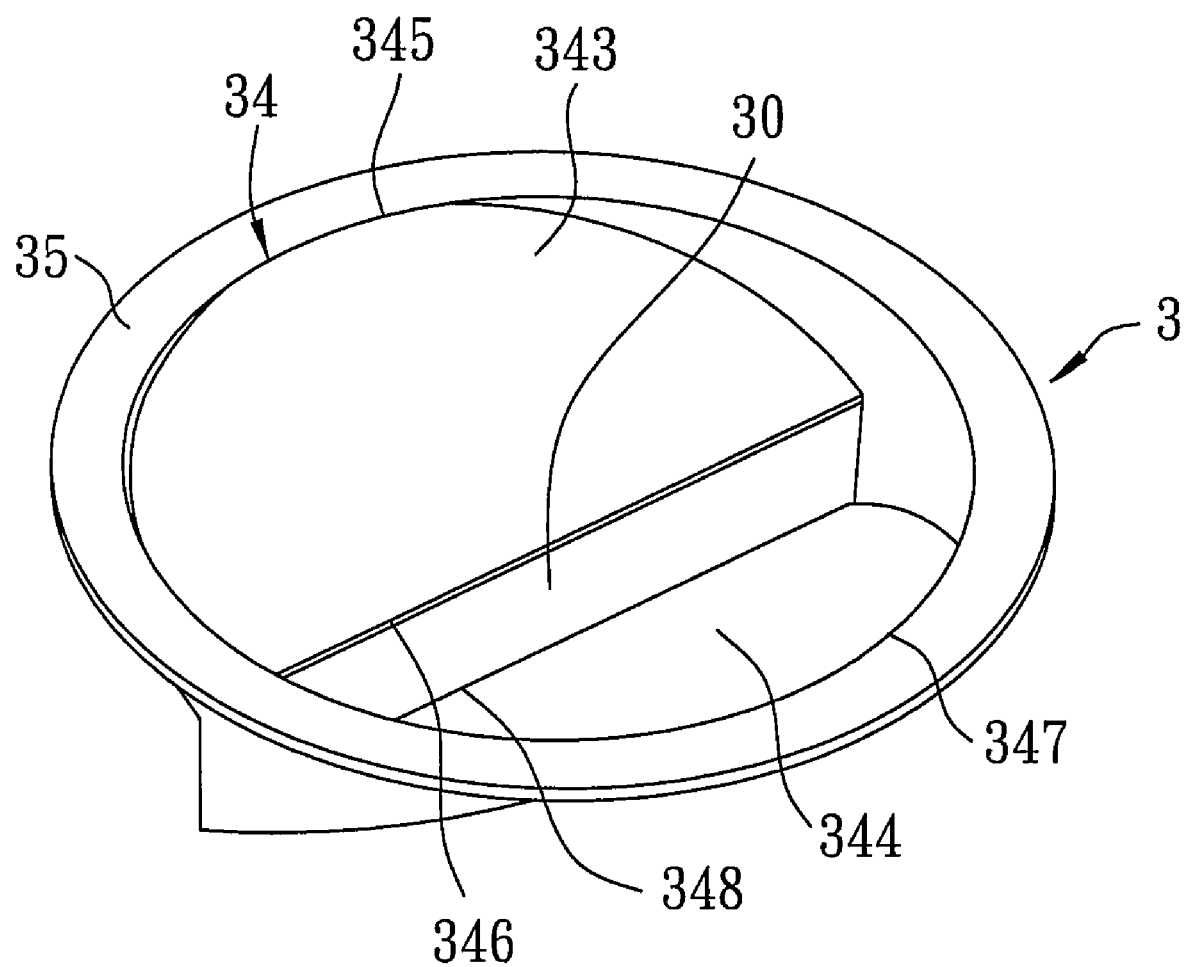
FIG. 4 is a perspective view of a stop unit of a second preferred embodiment of the pepper mill according to the invention.
Figure 5:
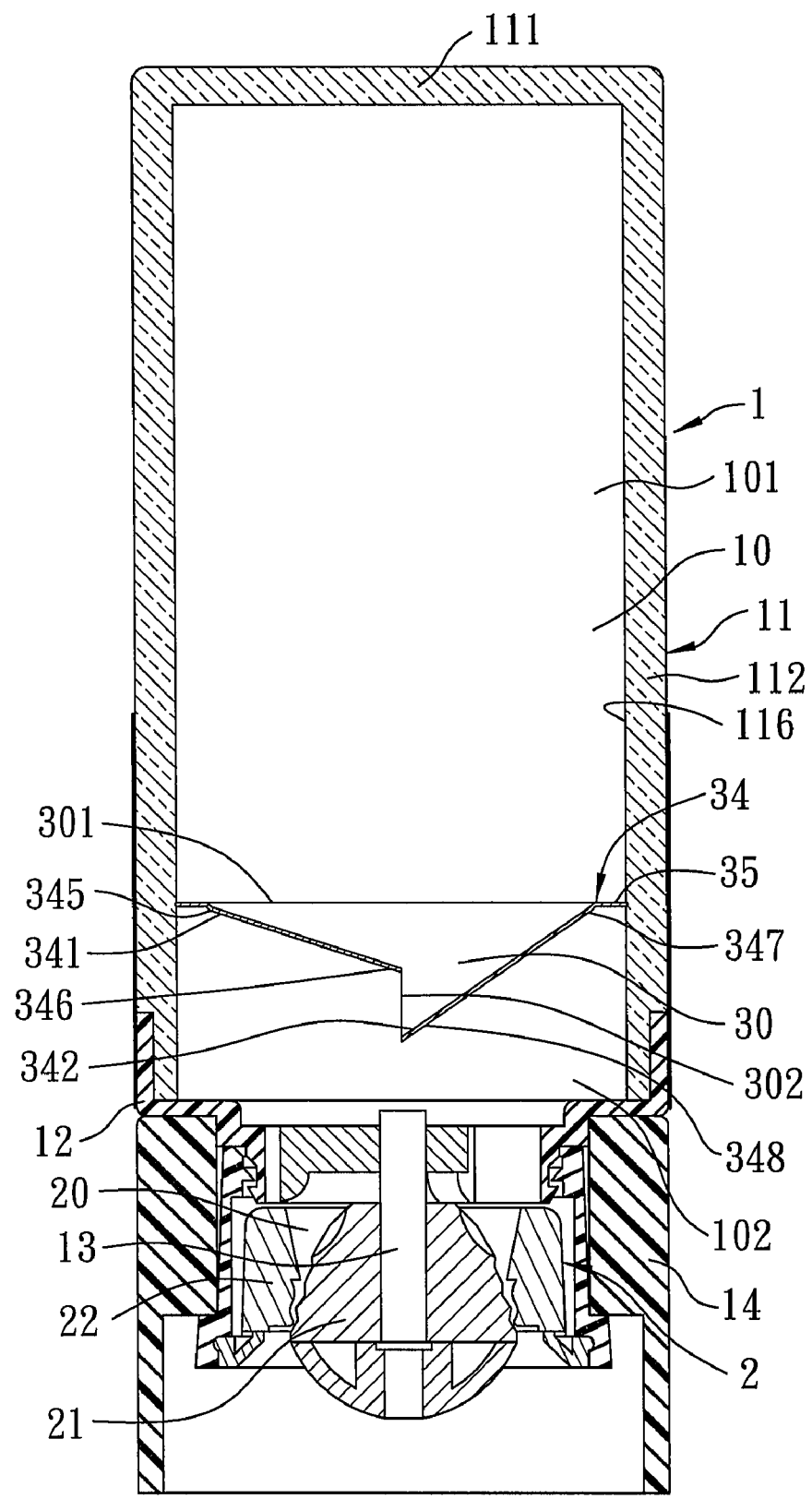
FIG. 5 is an assembled partly sectional view of the second preferred embodiment.

As shown in FIGS. 4 and 5, the second preferred embodiment of the pepper mill according to the present invention has a structure similar to that of the first embodiment. The main difference between this embodiment and the previous embodiment resides in the configuration of the stop unit 3. In this embodiment, the stop unit 3 includes a surrounding wall 34 with an inclined first wall portion 343 having a first connecting edge 345 and a first distal edge 346, and an inclined second wall portion 344 having a second connecting edge 347 that cooperates with the first connecting edge 345 to form a wider portion 341, and a second distal edge 348 that cooperates with the first distal edge 346 to form a narrower portion 342. The stop unit 3 further includes a flange 35 extending radially and outwardly from the wider portion 341 of the surrounding wall 34 and connected to the inner wall surface 116 of the surrounding container wall 112 of the container body 11, such that the narrower portion 342 is disposed between the wider portion 341 and grinding unit 2. In this embodiment, the surrounding wall 34 defines a passage 30 having a first opening 301 that corresponds to the wider portion 341 and that is in spatial communication with the first space portion 101 of the receiving space 10 in the receiving unit 1, and a second opening 302 that corresponds to the narrower portion 342 and that is in spatial communication with the second space portion 102 of the receiving space 10, that is smaller than the first opening 301, and that opens in a direction different from the direction of fall of the residual ground pepper from the grinding unit 2 when the pepper mill of the invention is at the non-dispensing position. The second preferred embodiment has the same advantages as those of the first preferred embodiment.

Figure 6:
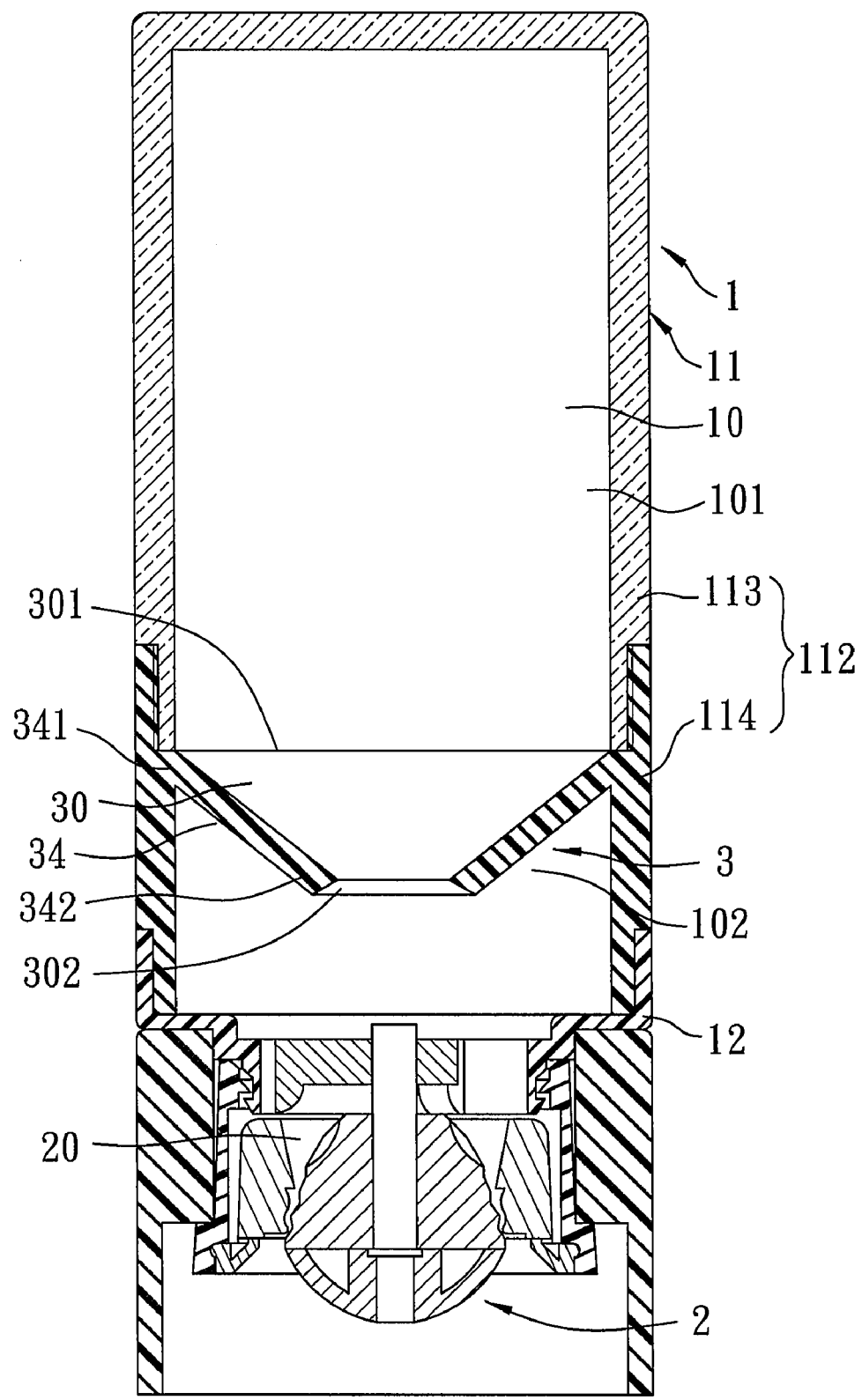
FIG. 6 is an assembled partly sectional view of a third preferred embodiment of the pepper mill according to the invention.

As shown in FIG. 6, the third preferred embodiment of the pepper mill according to the present invention has a structure similar to the first preferred embodiment. The main difference between this embodiment and the first preferred embodiment resides in the configurations of the container body 11 of the receiving unit 1 and the stop unit 3. The container body 11 includes a transparent part and an opaque part coupled threadedly to the transparent part, such that the transparent part and the opaque part form respectively the transparent and opaque wall portions 113, 114 of the surrounding container wall 112 of the container body 11. The stop unit 3 includes a frustoconical surrounding wall 34 that has a wider portion 341 connected to the opaque wall portion 114 of the surrounding container wall 112, and a narrower portion 342 formed between the wider portion 341 and the grinding unit 2. In this embodiment, the surrounding wall 34 defines a passage 30 having a first opening 301 that is in spatial communication with the first space portion 101 of the receiving space 10 in the receiving unit 1, and a second opening 302 that is in spatial communication with the second space portion 102 of the receiving space 10 and that is smaller than the first opening 301. In this embodiment, a projection of the second opening 302 to a plane of the grinding unit 2 is surrounded by the annular grinding opening 20. The third preferred embodiment has the same advantages as those of the first preferred embodiment.

Figure 7:
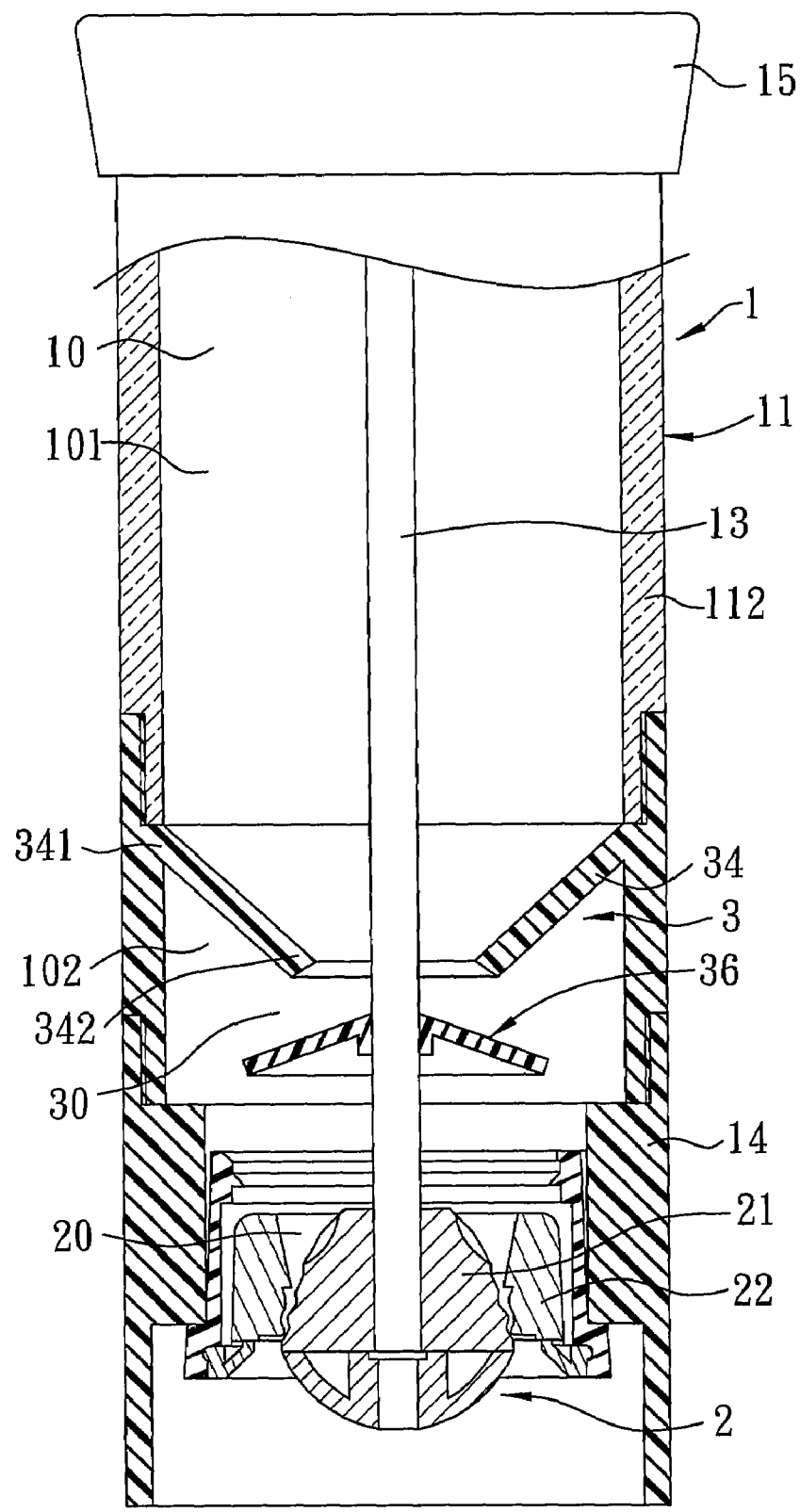
FIG. 7 is an assembled partly sectional view of a fourth preferred embodiment of the pepper mill according to the invention.

As shown in FIG. 7, the fourth preferred embodiment of the pepper mill according to the present invention has a structure similar to that of the third embodiment. The main difference between this embodiment and the third preferred embodiment resides in the configurations of the receiving unit 1 and the stop unit 3. The receiving unit 1 includes a container body 11, a rotary seat 15 disposed rotatably at one end of the container body 11, an end seat 14 coupled to the container body 11 at the other end opposite to the rotary seat 15, and a coupling shaft 13 extending from the rotary seat 15 into the end seat 14 and engaging co-rotatably the inner grinding seat 21 of the grinding unit 2. When the user rotates the rotary seat 15 relative to the end seat 14, the coupling shaft 13 also rotates along with the rotary seat 15, thereby driving rotation of the inner grinding seat 21 relative to the outer grinding seat 22 so as to grind peppercorns. The stop unit 3 includes a stop member 36 mounted co-rotatably to the coupling shaft 13, and a surrounding wall 34 surrounding the coupling shaft 13, and spaced apart from the stop member 36 at one side opposite to the grinding unit 2. In this embodiment, the stop member 36 is frustoconical and expands toward the grinding unit 2 such that a projection of the periphery of the stop member 36 to a plane of the grinding unit 2 surrounds the annular grinding opening 20 in the grinding unit 2. The surrounding wall 34 is frustoconical and has wider and narrower portions 341, 342 respectively distal from and proximate to the stop member 36. The stop unit 3 is formed with a passage 30 between the surrounding container wall 112 of the receiving unit 1 and a periphery of the stop member 36, extending through the surrounding wall 34, and having a first opening 301 at the wider portion 341 and a second opening 302 at the narrower portion 342 of the surrounding wall 34 such that a projection of the second opening 302 to the plane of the grinding unit 2 is surrounded by the projection of the periphery of the stop member 36 to the plane of the grinding unit 2. When the pepper mill of this embodiment is placed at the non-dispensing position after use, a portion of the residual ground pepper falling from the grinding unit 2 via the annular grinding opening 20 is stopped by the stop member 36 and the surrounding wall 34 from reaching the first space portion 101 of the receiving space 10 in the receiving unit 1. The fourth preferred embodiment has the same advantages as those of the first preferred embodiment. It should be noted that, while this embodiment is exemplified using the stop unit 3 with the stop member 36 and the surrounding wall 34, a stop unit 3 with the stop member 36 and without the surrounding wall 34 may be employed in other embodiments of this invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pepper mill comprising:
a receiving unit defining a receiving space adapted for receiving peppercorns;
a grinding unit disposed in said receiving unit at one end of said receiving space and adapted for grinding the peppercorns in said receiving space; and
a stop unit disposed in said receiving space, spaced apart from said grinding unit, and dividing said receiving space into first and second space portions that are respectively distal from and proximate to said grinding unit, said stop unit being formed with a passage to permit the peppercorns retained in said first space portion to fall into said grinding unit so as to be ground thereby through said second space portion when said pepper mill is disposed at a dispensing position where said grinding unit faces downwardly, and being configured to stop at least a portion of residual ground pepper in said second space portion from reaching said first space portion via said passage when said pepper mill is disposed at a non-dispensing position where said grinding unit faces upwardly;
wherein said stop unit includes a surrounding wall that defines said passage, said passage having a first opening that is in spatial communication with said first space portion, and a second opening that is in spatial communication with said second space portion,
said stop unit further including a cover member that is pivoted to said surrounding wall, that uncovers said second opening when said pepper mill is at the dispensing position, and that covers said second opening when said pepper mill is at the non-dispensing position.

2. The pepper mill as claimed in claim 1, wherein said receiving unit includes a container body having a surrounding container wall, said surrounding container wall including a transparent wall portion that confines said first space portion, and an opaque wall portion that is connected to said transparent wall portion and that has said stop unit provided therein.

3. A pepper mill comprising:
a receiving unit defining a receiving space adapted for receiving peppercorns;
a grinding unit disposed in said receiving unit at one end of said receiving space and adapted for grinding the peppercorns in said receiving space; and
a stop unit disposed in said receiving space, spaced apart from said grinding unit, and dividing said receiving space into first and second space portions that are respectively distal from and proximate to said grinding unit, said stop unit being formed with a passage to permit the peppercorns retained in said first space portion to fall into said grinding unit so as to be ground thereby through said second space portion when said pepper mill is disposed at a dispensing position where said grinding unit faces downwardly, and being configured to stop at least a portion of residual ground pepper in said second space portion from reaching said first space portion via said passage when said pepper mill is disposed at a non-dispensing position where said grinding unit faces upwardly;
wherein said stop unit includes a surrounding wall that defines said passage, said passage having a first opening that is in spatial communication with said first space portion, and a second opening that is in spatial communication with said second space portion and that opens in a direction different from a direction of fall of the residual ground pepper from said grinding unit when said pepper mill is at the non-dispensing position.

4. The pepper mill as claimed in claim 3, wherein said receiving unit includes a container body having a surrounding container wall, said surrounding container wall including a transparent wall portion that confines said first space portion, and an opaque wall portion that is connected to said transparent wall portion and that has said stop unit provided therein.

5. A pepper mill comprising:
a receiving unit defining a receiving space adapted for receiving peppercorns;
a grinding unit disposed in said receiving unit at one end of said receiving space and adapted for grinding the peppercorns in said receiving space; and
a stop unit disposed in said receiving space, spaced apart from said grinding unit, and dividing said receiving space into first and second space portions that are respectively distal from and proximate to said grinding unit, said stop unit being formed with a passage to permit the peppercorns retained in said first space portion to fall into said grinding unit so as to be ground thereby through said second space portion when said pepper mill is disposed at a dispensing position where said grinding unit faces downwardly, and being configured to stop at least a portion of residual ground pepper in said second space portion from reaching said first space portion via said passage when said pepper mill is disposed at a non-dispensing position where said grinding unit faces upwardly;
wherein said grinding unit has an annular grinding opening, and said stop unit includes a surrounding wall that defines said passage, said passage having a first opening that is in spatial communication with said first space portion, and a second opening that is in spatial communication with said second space portion, a projection of said second opening to a plane of said grinding unit being surrounded by said annular grinding opening.

6. The pepper mill as claimed in claim 5, wherein said receiving unit includes a container body having a surrounding container wall, said surrounding container wall including a transparent wall portion that confines said first space portion, and an opaque wall portion that is connected to said transparent wall portion and that has said stop unit provided therein.

7. A pepper mill comprising:
   a receiving unit defining a receiving space adapted for receiving peppercorns;
   a grinding unit disposed in said receiving unit at one end of said receiving space and adapted for grinding the peppercorns in said receiving space; and
   a stop unit disposed in said receiving space, spaced apart from said grinding unit, and dividing said receiving space into first and second space portions that are respectively distal from and proximate to said grinding unit, said stop unit being formed with a passage to permit the peppercorns retained in said first space portion to fall into said grinding unit so as to be ground thereby through said second space portion when said pepper mill is disposed at a dispensing position where said grinding unit faces downwardly, and being configured to stop at least a portion of residual ground pepper in said second space portion from reaching said first space portion via said passage when said pepper mill is disposed at a non-dispensing position where said grinding unit faces upwardly;
   wherein said grinding unit has an annular grinding opening, and said stop unit includes a stop member, said passage being formed between said receiving unit and a periphery of said stop member, a projection of said periphery of said stop member to a plane of said grinding unit surrounding said annular grinding opening.

8. The pepper mill as claimed in claim 7, wherein said stop unit further includes a surrounding wall spaced apart from said stop member at one side opposite to said grinding unit, said passage extending through said surrounding wall and having a first opening at one end of said surrounding wall distal from said stop member that is in spatial communication with said first space portion, and a second opening at another end of said surrounding wall proximate to said stop member that is in spatial communication with said second space portion, a projection of said second opening to the plane of said grinding unit being surrounded by the projection of said periphery of said stop member to the plane of said grinding unit.

9. The pepper mill as claimed in claim 7, wherein said receiving unit includes a container body having a surrounding container wall, said surrounding container wall including a transparent wall portion that confines said first space portion, and an opaque wall portion that is connected to said transparent wall portion and that has said stop unit provided therein.

* * * * *